US006948108B1

(12) United States Patent
Ludwig et al.

(10) Patent No.: US 6,948,108 B1
(45) Date of Patent: Sep. 20, 2005

(54) METHOD AND DEVICE FOR REDUCING THE PROCESSING TIME OF DATA IN COMMUNICATION NETWORKS

(75) Inventors: Reiner Ludwig, Düren (DE); Bela Rathonyi, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/468,042

(22) Filed: Dec. 21, 1999

(30) Foreign Application Priority Data

Dec. 22, 1998 (EP) .................................. 98124010

(51) Int. Cl.⁷ ............................................... H04L 1/16
(52) U.S. Cl. ...................................... 714/748; 370/473
(58) Field of Search ......................... 714/748; 370/473

(56) References Cited

U.S. PATENT DOCUMENTS

| | | | | |
|---|---|---|---|---|
| 4,703,475 A | | 10/1987 | Dretzka et al. ................ | 370/60 |
| 5,243,592 A | * | 9/1993 | Perlman et al. ............. | 370/252 |
| 5,570,367 A | * | 10/1996 | Ayanoglu et al. ........... | 370/346 |
| 5,708,656 A | * | 1/1998 | Noneman et al. ........... | 370/335 |
| 5,729,536 A | * | 3/1998 | Doshi et al. ............. | 370/310.1 |
| 5,862,452 A | * | 1/1999 | Cudak et al. ................ | 725/81 |
| 5,920,545 A | * | 7/1999 | Rasanen et al. ............ | 370/229 |
| 5,930,233 A | * | 7/1999 | Kanerva et al. ............ | 370/231 |
| 5,936,965 A | * | 8/1999 | Doshi et al. ................ | 370/465 |
| 5,978,386 A | * | 11/1999 | Hamalainen et al. ....... | 370/466 |
| 6,011,796 A | * | 1/2000 | Rezaiifar et al. ........... | 370/394 |

(Continued)

FOREIGN PATENT DOCUMENTS

EP          0 877 513          11/1998

(Continued)

OTHER PUBLICATIONS

Perkins, "Requirements for an Internet Standard Point-to-Point Protocol", RFC1547, Dec. 1993.*

(Continued)

*Primary Examiner*—Stephen M. Baker (57) ABSTRACT

The invention relates to a method and a device for improving the processing time of received data in packet oriented applications during a transmission via communication networks, in particular via an IP network and a mobile communication network such as the Global System for Mobile Communication (GSM), Universal Mobile Telecommunication System (UMTS) or General Packet Radio Service (GPRS). The received data packets of the second protocol layer, for instance, the RLP frames, are combined to form data packets of the first protocol layer, for instance to PPP frames, directly by the receiver in the second protocol layer. The completely and correctly combined data packets are then released to the first protocol layer. During the release of the data packets to the first protocol layer, a difference is made between two modes. The intra-flow mode is a mode, wherein all completely generated data packets are released, i.e. independent from whether the data packets belong to the same or to two different data flows. In contrast thereto, a difference is made in view of the inter-flow mode. In said mode only the completely generated data packets belonging to different data flows are released to the first protocol layer.

24 Claims, 7 Drawing Sheets

U.S. PATENT DOCUMENTS

| | | | | |
|---|---|---|---|---|
| 6,057,943 | A * | 5/2000 | Kweon et al. | 358/435 |
| 6,111,866 | A * | 8/2000 | Kweon et al. | 370/335 |
| 6,112,084 | A * | 8/2000 | Sicher et al. | 370/347 |
| 6,169,732 | B1 * | 1/2001 | Hetherington et al. | 370/335 |
| 6,226,301 | B1 * | 5/2001 | Cheng et al. | 370/209 |
| 6,236,647 | B1 * | 5/2001 | Amalfitano | 370/230 |
| 6,256,300 | B1 * | 7/2001 | Ahmed et al. | 370/331 |
| 6,301,479 | B1 * | 10/2001 | Roobol et al. | 455/436 |
| 6,307,867 | B1 * | 10/2001 | Roobol et al. | 370/342 |
| 6,310,893 | B1 * | 10/2001 | Yuan et al. | 370/316 |
| 6,314,101 | B1 * | 11/2001 | Rezaiifar et al. | 370/394 |
| 6,317,224 | B1 * | 11/2001 | Lutgen et al. | 358/412 |

FOREIGN PATENT DOCUMENTS

| | | |
|---|---|---|
| WO | WO 96/21984 | 7/1996 |

OTHER PUBLICATIONS

Rand, "PPP Reliable Transmission", RFC1663, Jul. 1994.*

Armitage G. J. et al., *Packet Reassembly During Cell Loss. Network Tranmission of Datagrams by the ATM Adaption Layer Can Produce Lost Cells, Resulting in Incorrect or Aborted Datagram Reassembly*, vol. 7, No. 5, Sep. 1, 1993, pp. 26-34.

*Transmission Control Protocol Specification*, Sep. 1981.

*PPP Reliable Transmission*, Request for Comment, Jul 1994.

Lievens, K., EPO Search Report on EPO Patent Application No. 98124010.4, May 6, 1999, pp. 1-4.

* cited by examiner

METHOD AND DEVICE FOR REDUCING THE PROCESSING TIME OF DATA IN COMMUNICATION NETWORKS

BACKGROUND OF THE INVENTION

The invention relates to a method and device for improving the processing time of received data in packet oriented applications in the transmission via communication networks, in particular via an IP network and a mobile communication network such as the Global System for Mobile Communication (GSM), the Universal Mobile Telecommunication System (UMTS) or the General Packet Radio Service (GPRS).

A protocol is defined as an entirety of all declarations between partner instances for the purpose of a common communication. Thus, a common binding protocol is a prerequisite for an exchange of data between two communicating network nodes. It is required that the protocols are defined universally and compatible among each other, for only on a uniform basis is it possible to link different networks with each other in sequence to communicate also beyond the limits of a system.

In terms of a modular structure the entire protocol of a communication is divided into layers. Each layer solves the tasks allocated to it by means of its own protocol. A communication between the adjacent layers is guaranteed via clearly defined interfaces. In this case, a layer n is linked to the layer n+1 directly on top thereof by rendering services to said layer, and to layer n−1 directly beneath said layer by using the services of said layer. Additionally there is a communication with layer n of the communication partner by using the services of all inferior layers. Thus, the logical data flow of protocol data units PDU is realized on respectively one protocol layer. On the receiving side the data are processed in a reverse sequence, i.e. the data are released from the lower layers to the protocol layers directly on top thereof.

The structure of the protocol stack can vary in response to the physical network and the application. The variation must, however, be within the compatible limits to guarantee the communication between different networks. The standardized protocol stack for internet applications is the TCP/IP (transmission control protocol/internet protocol) protocol stack.

Figure 2:
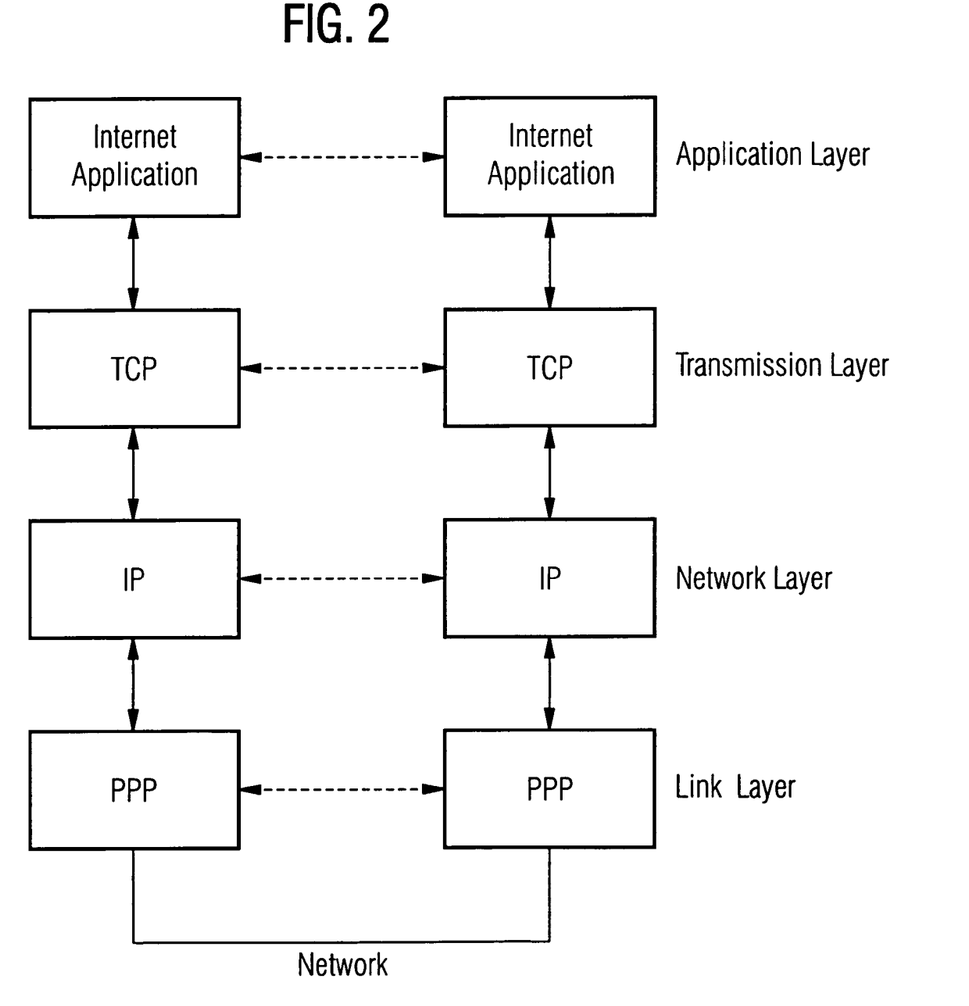
FIG. 2 shows an illustration of protocol layers in the internet.

It consists of four layers. The uppermost layer—the application layer—comprises application protocols. A transport protocol, for instance, the so-called TCP (transmission control protocol) is arranged directly thereunder. The internet protocol—the so-called IP forms the network layer. The two lowermost layers—the link layer and the physical layer—can be combined to form the term network oriented layers, as they are specifically defined in response to the network arranged thereunder. Said modular structure of the TCP/IP protocol stack and the communication links between the respective layers are illustrated in FIG. 2.

The transport protocol TCP offers a reliable transmission service for a byte flow. Reliability hereby refers to being free of errors, maintenance of sequences and protection against data losses and duplicates. The error correction takes place by using the so-called ARQ (automatic repeat request) method. A copy of the packet to be sent is generated on the transmitting side and preserved until the data packet sent is generated on the transmitting side and preserved until the data packet sent is positively acknowledged by the opposite side. The receiver examines the packet received and acknowledges the correct receipt by means of a positive acknowledgment and rejects the receipt of an incorrectly received packet. In this respect it has to be noted that TCP does not allow the transmission of negative acknowledgments. The repeat of an incorrectly transmitted packet is effected by means of a mechanism based on the positive acknowledgments, i.e. if there is no positive acknowledgment the transmitter concludes under certain circumstances that a packet has not been received.

The byte flow to be transmitted, which is passed from the application layer to the TCP layer, is divided into segments by the TCP for being transmitted as IP datagrams. An IP datagram designates a data packet being formatted according to the rules of the IP protocol. The property of datagrams consists in that the data exchange being realized by using datagrams is not reliable. Thus, the IP does not guarantee that a packet is indeed transmitted to a receiver. Also IP datagrams can be confused in their sequence, or can arrive at the receiver in duplicates. Within the limits of this concept it is, however, the task of TCP to detect the faulty transmission and to correct the errors that have occurred.

The IP datagrams are, moreover, transmitted according to the hierarchy principle to the link layer arranged directly underneath. Said layer receives the IP datagrams and organizes them in so-called frames. This takes place by means of a method referred to as framing, i.e. the link layer packages an IP datagram in one or more frames, wherein the frames are limited by using specific bit combinations. It is specified as to which bit combination refers to the beginning separator, the so-called initial mark, and which to the end separator, the so-called end mark, of a frame.

Apart from the framing, the link layer fulfills two additional tasks. The link layer is also responsible for the error detection. Thus, incorrectly transmitted frames are usually rejected by the receiver of the link layer. For this purpose the data packet is provided with a field for applying a so-called cyclic code, the so-called frame checking sequence FCS or the cyclic redundancy check CRC. It is the idea to interpret a data packet as a polynomial. The transmitter supplements the data packet in such a way that the receiver receives the remainder 0 by the division through a so-called generator polynomial. Thus, the error detection is realized. The link layer optionally also effects the error correction. This takes place by repeating incorrectly received packets, for instance, by using the ARQ method.

Protocols of the link layer are usually applied between physically directly adjacent network nodes. For this purpose a number of alternative protocols have been defined. As to which protocol is applied between two network nodes depends on the network by means of which the two network nodes are linked. The known point-to-point protocol, the PPP, forms an example for a protocol of the link layer. The PPP fulfills the first two jobs of the link layer—the framing and the error detection. Thus, the PPP does not perform a repeat of the incorrectly received packets. Even though there is a specific implementation mode of PPP working in a so-called, "numbered mode" RFC1663, it is usually not used.

Due to the fact that the PPP does not support a correction through the repeated packet transmission, or because the process would be inefficient at high transmission error rates, an additional protocol is applied in networks having a particularly high error rate in a data transmission. The mobile communication networks, for example, are known to be networks with high transmission error rates. The GSM (Global System for Mobile Communication) and the GPRS (General Packet Radio Service) are to be classified therein. An additional protocol—the so-called RLP (radio link protocol) is applied on the link layer of the GSM network. The RLP segments the byte flow received from the PPP layer into frames, which are usually smaller than the frames on the PPP level. The error correction is handled by the ARQ method on the basis of said frames. The functionality of ARQ requires that the frames are numbered consecutively. Therefore, each frame receives a clear continuous sequence number during the grouping. In today's implementing stadium the byte flow is segmented transparently into RLP frames and packaged. Thereby it remains unconsidered as to which kind of data, control data or actual data are concerned.

Exclusively a byte flow can be seen by the RLP layer. It can thereby occur that data from two different PPP frames are combined in one RLP frame. The RLP frame then receives the end mark of the first PPP frame and equally the initial mark of the following PPP packet. The solution for this problem is provided in EP 98 113 212.9 suggesting to examine the byte flow for separators in the sender. Thus, a difference is made between the different PPP packets when packaging the byte flow into RLP packets on the transmitting side thereby avoiding that data from two PPP packets are combined in an RLP.

The same functionality is realized in the GPRS network by means of the RLC protocol, resulting from that both protocols, the RLP and the RLC are similar to the ISO standard HDLC (high level data link control) ISO87 and accordingly have a similar structure. A difference between the protocols lies in the generation of the frames.

It is the aim of a hierarchic structure to develop a protocol architecture, wherein the protocol layers and above all the protocols are independent from one another in view of a horizontal aspect. Thus, it is obtained that different applications and different transport protocols are transmitted via the same network protocol, such as the internet protocol IP. Moreover, it allows that an IP protocol layer can function on different physical platforms. Accordingly, the IP datagrams can be transmitted via different physical networks, such as the GSM, the Internet, the GPRS.

To the user the communication on the protocol levels remains substantially invisible. He expects from the available system to support the different application services, such as transmitting and receiving e-mails, data flow or web-browsing. The data made available for the transmission frequently exceed the size of the packages which can be transmitted over a physical link. For this reason, a message is divided into smaller packets, which are consecutively arranged for a transmission. The division of the data is part of the formatting. The formatting of the data is performed on each protocol layer. On certain protocol layers, such as the RLP layer, a division of data takes place, i.e. said data are sub-divided into smaller data blocks. The data blocks have different names on the different layers, for instance, they are called datagrams on the IP protocol layer, and frames on the link layer. Moreover, the data blocks, which do not refer to a protocol layer individually, are designated by the term data packet.

The formatting of the data comprises in particular the addition of control data being characteristic for each protocol layer. In most cases the control data are appended to the beginning of a data packet in form of the so-called header and/or at the end in form of the so-called tail. The actual data are contained in the user data field. Said mechanism is explained in more detail in the following by means of a TCP/IP protocol stack.

Figure 3:
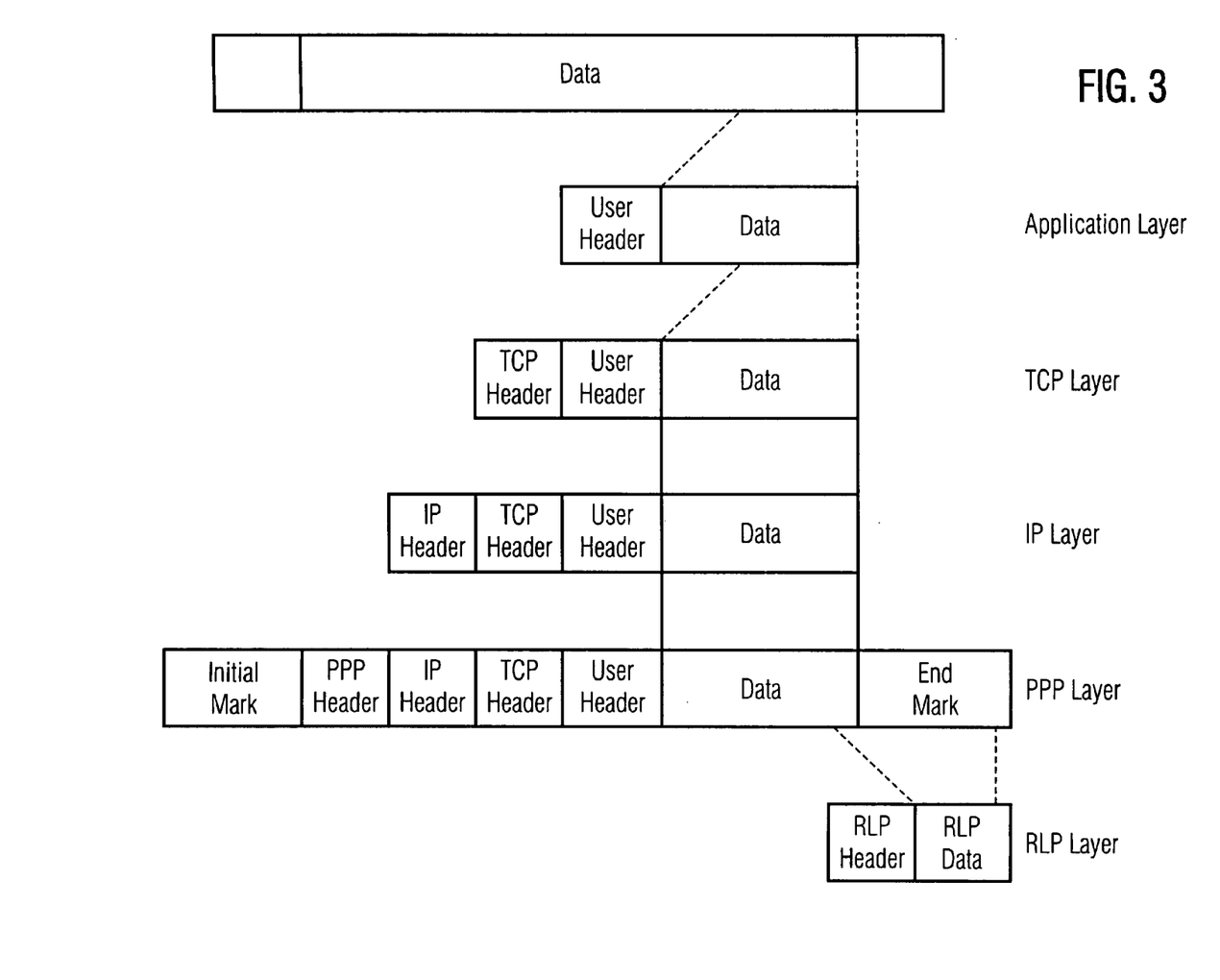
FIG. 3 shows a schematic diagram of user data.

According to FIG. 3 the user data are segmented on the application layer, and control information is added to each data packet. Said data packets are consequently forwarded to the transport layer TCP. Said layer adds its control data in form of a header. Said data are passed on to a network layer, where, for instance, the IP contains the relevant control data like routing information. In this way an IP datagram is formed, which is passed on to a link layer in the following step. The protocols of the link layer, such as for example the PPP, process the data received by adding own control information such as the separators. The data packets being generated on this level are called frames. Said frames are then transmitted via the available network. It occurs that the data packets arrive at the receiver of a certain layer in a different sequence. It can be the job of the receiver of this layer to reproduce the transmitted sequence. This is the job of, for instance, a TCP or an RLP receiver, however, not, for example, of an IP receiver.

The mechanism of packaging the data on the protocol layers is known by the term of encapsulation. The reverse function is called decapsulation and is performed on the receiving side.

In the following, the data packets, which either refer to the RLP frames or the RLC frames or also to the PPP frames each working in a numbered mode, are designated by the general term L2ARQ frame.

In form of the L2ARQ frames the user data are sent to a receiver. At the same time, the L2ARQ frames are stored in a buffer of the transmitter. This seems required in case that the packet is repeated. By means of the consecutive numbers in the L2ARQ frames it is determined by a receiver as to whether a packet has been lost during transmission. If an L2ARQ frame is lost, the repeat of said L2ARQ frame is initiated. By means of a corresponding mechanism the transmitter receives a message on the error occured, and the packet with the corresponding number is taken from the buffer and transmitted anew. If a packet is successfully transmitted to the receiver, it is removed from the buffer on the transmitting side.

The mechanism described refers to the so-called numbered mode. Said mode renders a reliable service by assuring a reliable data transmission from a transmitter to a receiver. There also is the so-called non-numbered mode. In said mode no error correction is performed by using the ARQ process. Thus the mode renders an unreliable service.

The repeat of the packets, however, entails that the packets arrived on the receiving side are provided in a sequence that does not correspond to the transmitted sequence.

In present development procedures it is the task of the link layer protocol—provided that it supports the ARQ—to bring the L2ARQ frames into the transmitted sequence. This implies that, for instance, the RLP packets received are accumulated in a buffer on the receiving side until the sequence of the RLP packets is reproduced. This means that an RLP frame is released to the layer directly on top thereof only when said frame has been received completely and when said frame is the following one in the sequence. If, however, a frame is repeated due to an error, all subsequent already received frames are kept in the buffer until the repeated frame has been received without errors. Only when the RLP packets are arranged in a corresponding sequence, which is generated by means of the sequence numbers, are they consequently passed on to the PPP layer. Prior to that the control information is deleted.

The receiver of the PPP layer performs an identification of the PPP frames. For this purpose the separators are searched. When a PPP frame has been recognized to be complete, the IP datagram received is passed on to the IP layer which then passes the TCP segment received on to the TCP protocol layer.

Due to the fact that the L2ARQ frames are temporarily stored on the link layer allowing to bring said frames into the corresponding sequence, high processing times can occur. In particular this has a negative effect on the applications being sensitive to time delays. Long time delays at any rate impair the efficient data processing. In case of the applications being sensitive to delays this may even cause the abort of a performance. Additionally this method requires a great buffer on the corresponding protocol layers, particularly, however, on the RLP protocol layer, because the packets are temporarily buffered on said level until the requested sequence has been reproduced. Long data storage times, however, result in long delay times for the data processing in a hierarchic protocol architecture.

SUMMARY OF THE INVENTION

Accordingly, it is the object of the present invention to provide a method and a device guaranteeing a more efficient processing of the data by the receiver in packet oriented applications in a data transmission. In particular it is an object of the invention to reduce the memory space requirement on the receiving side.

It is advantageous, that no long temporary storing times occur through the direct transmission of the packets completely generated on the link layer to the protocol layer provided directly on top thereof.

For this reason it has also proved to be advantageous that the data received are faster transmitted to the application layer thereby guaranteeing a more stable working mode of applications sensitive to delays.

Another advantage consists in the reduction of the required storage capacity on the corresponding protocol layer on the receiving side, as the data received are not kept in the buffer until a corresponding sequence of the data received is provided, but the completely generated packets are directly released to the protocol layer on top thereof, even if some data packets have possibly not been received before.

BRIEF DESCRIPTION OF THE DRAWINGS

In the following, the invention is explained in more detail by means of embodiments and figures, wherein.

DETAILED DESCRIPTION OF EXEMPLARY EMBODIMENTS

Figure 1:
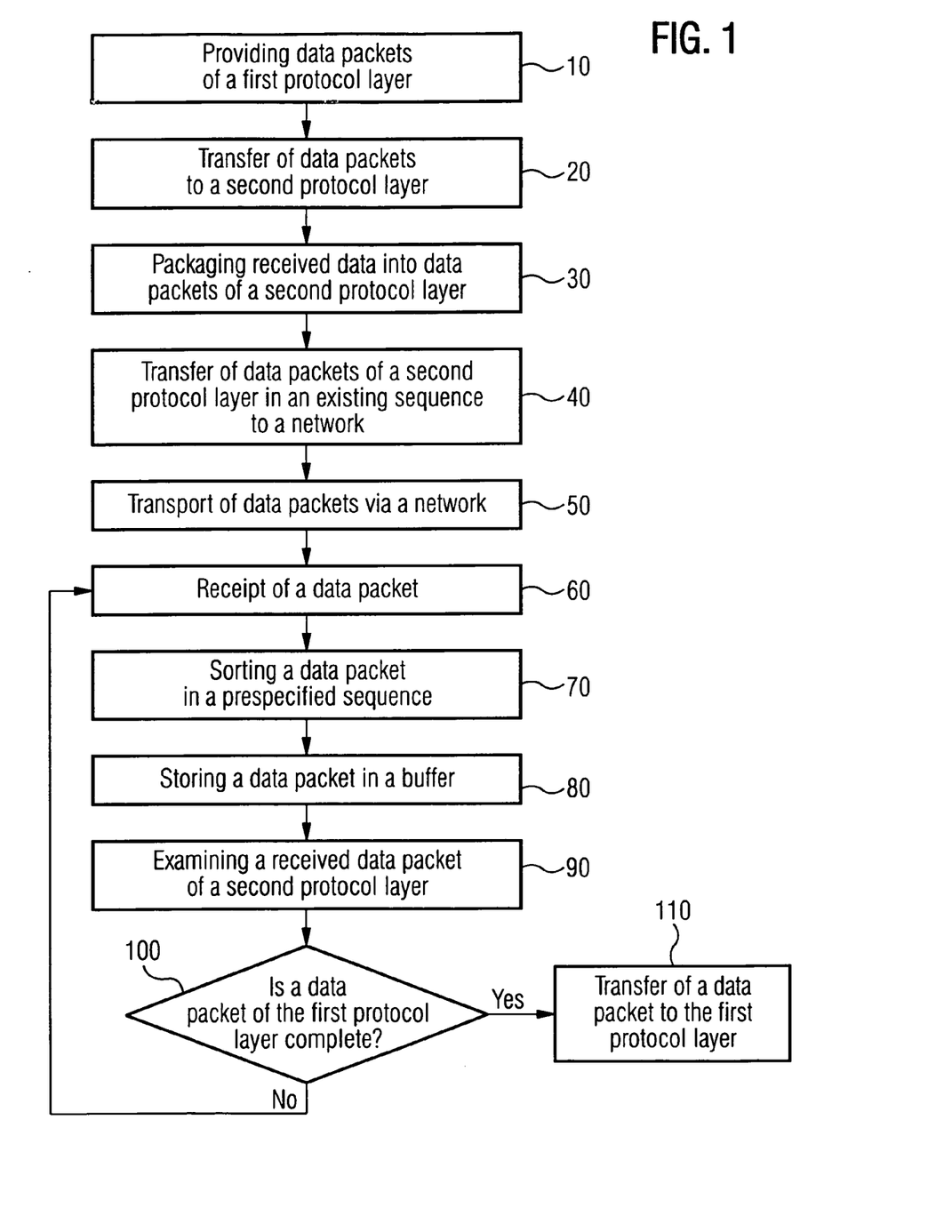
FIG. 1 shows a flow chart of the method according to the invention.

According to FIG. 1 data packets of a first protocol layer are provided on a transmitting side 10 and are consequently passed on to a second protocol layer directly underneath thereof 20. Said layer packages the data received into data packets of the second protocol layer 30. In this respect attention is made that a data packet of the second protocol layer does not contain the data of two different data packets of the first protocol layer. Each data packet of the second protocol layer receives a unique sequence number. The data packets of the second protocol layer packaged in this way are passed on to an available network in the present sequence 40 and are consequently transmitted via the network 50. The individual data packets of the second protocol layer are received on a receiving side 60.

The data packets of the second protocol layer received are sorted into a sequence by means of the sequence number 70 and are stored in buffer provided 80. They are examined in sequence to recognize the data packets of the first protocol layer 90. If a data packet of the second protocol layer is received, it is examined first whether this data packet contains separators of the first protocol layer. If so, either an initial mark or an end mark of a data packet of the first protocol layer is concerned. In case of an initial mark this means that the subsequent data packets of the second protocol layer belong to a new data packet of the first protocol layer. The data packets of the second protocol layer are kept in the buffer until a data packet of the first protocol layer has been received completely 100. This is detected by means of the receipt of a data packet of the second protocol layer, wherein the data field contains an end mark and moreover is the following one in a sequence. Only a completely generated data packet of the first protocol layer is released to the protocol layer directly on top thereof 110.

A formatting of data packets of a first protocol layer on a second protocol layer and their arrangement according to a transmitting sequence is realized by a means for providing data packets of a first protocol layer to a second protocol layer. Said data packets are transmitted via a provided network by transmitting means. The receiving means for receiving the data packets on the receiving side receives the packets. With sorting means for sorting the data packets the received data packets are brought into a sequence of consecutive data packets and are stored in a buffer for the temporary storage of the received data packets of the second protocol layer. The data packets of the second protocol layer are examined as to whether a data packet of the first protocol layer can be recognized. This takes place by using detecting means for detecting a completely combined data packet of the first protocol layer. Consequently, a completely generated data packet of the first protocol layer is examined by an examining means for the association to a data flow. Thereupon an examined data packet is released by means of a releasing means for releasing a completely generated data packet to the first protocol layer.

A possible field of application of the invention is in the field of internet applications via a mobile data network, such as the GSM. A possible application of the invention is hereinafter explained in more detail by means of an embodiment, whereby the processing of the data is illustrated as of the application on the transmitting side up to the release of the completely generated data packets on the receiving side.

Figure 4:
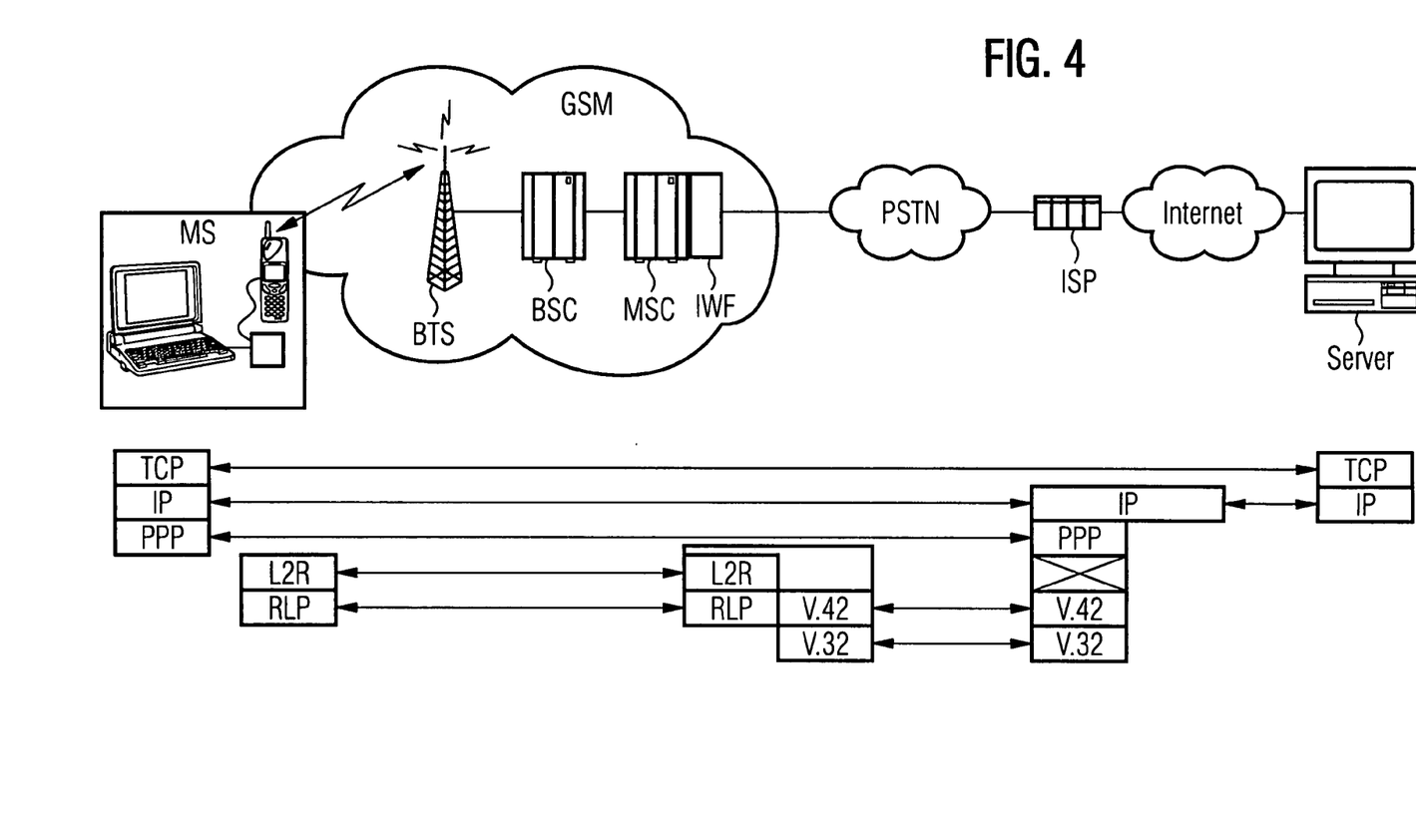
FIG. 4 shows an illustration of a network system.

For this purpose a network system is used, which is schematically shown in FIG. 4. A communication between a mobile subscriber, for instance, with a mobile station, and a subscriber integrated into a fixed network, server, is hereby illustrated schematically. The upper part of the figure shows the physical link with the corresponding communication units, and the lower part constitutes the logical link with the involved protocols.

The mobile station MS can, for instance, be a laptop computer. Said laptop computer is connected via a terminal adaptation function (TAF), the task of which is, for instance, performed by the PCMCIA card (Personal Computer Memory Card International Association), with the mobile station MS, for instance, a mobile phone. The mobile station MS communicates with a BTS (Base Transceiver Station), which again communicates with a BSC (Base Station Controller). The connection to a public analog telephone network, the so-called public switched telephone network (PSTN), is realized by means of a modem, which is integrated in the so-called interworking function IWF. The interworking function IWF is part of the mobile switching center, the so-called mobile services switching center (MSC). Moreover, the connection runs via a public telephone network PSTN to an internet service provider (ISP), which has a network transition node to the internet. The connection to a terminal subscriber, server, is built up via the internet. For the sake of distinctness the connection via the internet has not been illustrated in more detail in FIG. 4.

It is to be noted that the applications are implemented independent from the underlying protocol layers. The transmission of the data generated thereby is performed in a manner transparent to the user. This is also the goal of the hierarchic structure of the protocol stack, namely to guarantee an optimum and stable transmission without having to involve the user into the facts of the system. It is, however, expected from the underlying system that it supports all applications used by the user, such as the access to the internet or the transfer of video data. The different applications, however, have different requirements on the system.

Certain internet applications like a banking transaction, for example, require a safe transport protocol, for only in this way is an error-free data flow during money transactions via the internet guaranteed. A safe transmission of data is guaranteed by the so-called Transmission Control Protocol TCP.

In contrast thereto it is not required in the case of a video transfer to use a protocol guaranteeing reliable safety of the data transmission, as the safety of a reliable data flow is possibly associated with longer delay times in the transmission. In the case of video transmission it is better to guarantee for a faster transmission of data in sequence to thereby obtain a realistic impression in the presentation of the video images. The errors that may occur during a transmission are within certain limits and can be tolerated when the video images are broadcast. For this reason an error-correcting protocol is not used in video transmission. An example for such protocols of the transmission level is the so-called User Datagram Protocol UDP.

In most cases a user uses several applications during one session, for example, if he wants to send an e-mail and transmit a video in the background at the same time. In this case, the user generates two different data flows, whereby the e-mail transmission is based on the TCP and the video transmission is based on the UDP. Another example is the internet access. In most cases several internet pages are addressed during one session, which are often localized on different servers. Although the generated data flows are exclusively TCP flows, different data flows are concerned in this case as the receivers are different ones.

Figure 5:
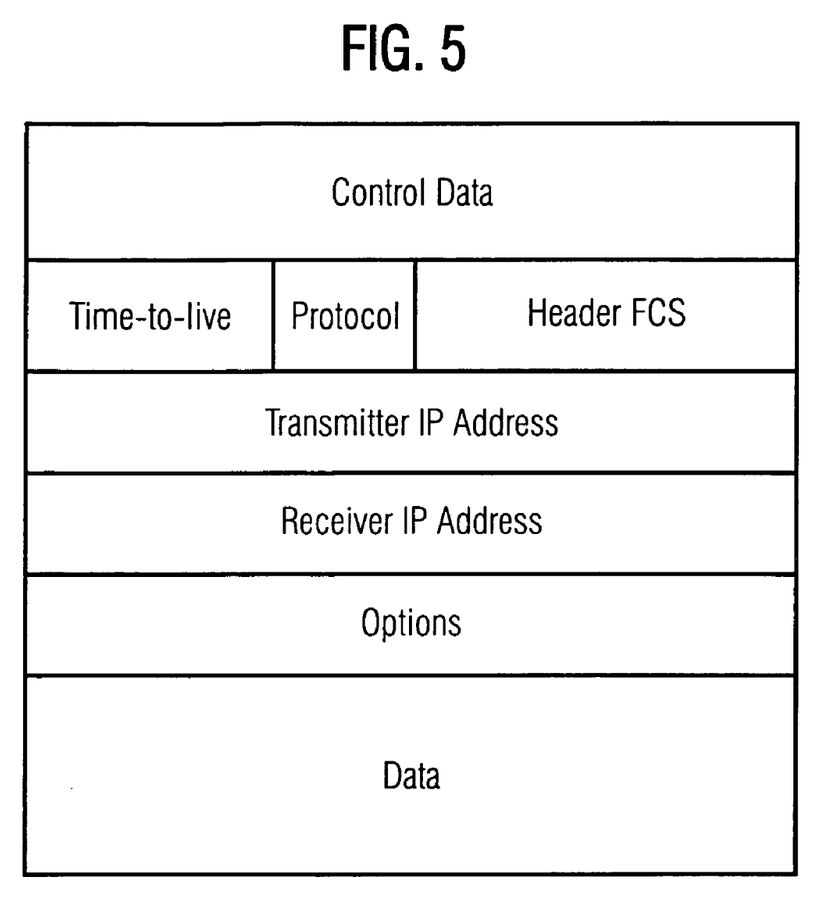
FIG. 5 shows an Internet Protocol diagram.

Said distinction is taken into account on the network protocol layer, such as the IP layer. Said layer receives packets from the transport protocol layer and packages them to form packets of their own format. FIG. 5 illustrates a format of an IP packet. Said packet contains control data among which, for instance, the version of the IP protocol is included, for instance, IPv4 or IPv6. This has not been shown in detail in FIG. 5. Moreover, the IP data format is provided with a field containing the information in respect of the transport protocol. In case of a UDP protocol this means that a bit combination is entered into said field, which corresponds to the designation of the UDP.

The decisive factor when distinguishing the data flow is, however, not only the type of protocol, but also the factor as to which addresses are contained in the IP header. This means, if both the IP address of the transmitter and the IP address of the receiver are identical in two IP packets according to FIG. 5, the TCP header must additionally be examined in sequence to find out the difference between the data flows. Different port numbers are allocated to different data flows. Said port numbers identify the corresponding data flow on the transmission level, by means of which a communication between the partner instances is guaranteed. The header of a TCP packet contains the information in view of the port number, which are compared when differentiating the data flow. Only when the port numbers of the transmitter and the receiver are identical is the data flow the same. If said addresses are different, i.e. if both the IP addresses and the port numbers differ from each other, the receivers are different and, therefore, the data flows are different. Said mechanism is implemented in the nowadays used version of the IP, the so-called Internet Protocol version 4 IPv4. In the next version of IP, the so-called Internet Protocol version 6, IPv6, the definition is basically the same. Here, different data flows are differentiated by means of so-called data flow identifiers—also called flow identifiers. The method described can also be transferred on IPv6 and basically to each protocol stack where the data flow can be identified.

In dependence on whether the packets on the IP layer derive from identical or from different data flows, a difference is made between two modes. In case of IP packets of an identical data flow a so-called intra-data flow mode or intra-flow mode is concerned. The term inter-flow mode designates a mode, in which IP packets belonging to different data flows are differentiated.

According to FIG. 4, in the case where a link on the transport layer between a mobile station and a server in the internet has already been built up, an example of a data flow from said server to the mobile station MS is hereinafter shown. In this example, the involvement of the communication units and the communication protocols is explained in more detail.

The IP datagrams packaged on the network layer are transmitted via the Internet to a so-called Internet Service Provider ISP. The ISP transmits the received IP packets to the PPP layer. Said layer generates a byte flow formatted in PPP frames from the data obtained. For differentiating between the respective packets, the separators are added. Consequently, the PPP frames are provided for an analog transmission. The ISP provides a modem for the transmission modulating the data to an audio signal in response to the transmission rate and mode. In the illustrated example, in which a connection runs via an analog network, the PSTN, this is a V.32 modem. If the connection runs via an ISDN network, a protocol V.110 is, for instance, used. For controlling the flow, i.e. in sequence to avoid a data overflow in the interworking function IWF, a V.42 protocol is used. Said task corresponds to the task of the radio link protocol RLP in the GSM.

Figure 6:
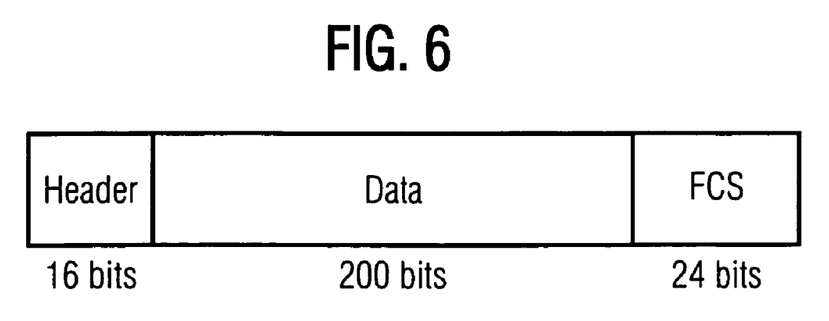
FIG. 6 shows an illustration of an RLP frame.

In the interworking function IWF, the conversion of the data received into the format intended for GSM takes place. This means that the byte flow of the PPP layer is released to the RLP layer. Said layer packages the received byte flow in RLP frames. A format of an RLP frame is illustrated in FIG. 6. An RLP frame consists of 240 bits. 16 bits thereof are intended for the header information and 24 bits for the frame checking sequence FCS. A decisive factor when packaging the PPP frames in RLP frames is that data packets of the higher protocol layers are not directly visible to the RLP layer in the byte flow received. This means particularly that the RLP layer cannot make a difference between the PPP frames or between the IP datagrams and thus between the packets of the transport layer. For differentiating the packets, the byte flow has to be checked for the separators. This is necessary for avoiding that data from two different PPP frames are packaged in one RLP frame. Each newly generated RLP frame is provided with a sequence number.

Packets arranged in this way are transmitted via a provided mobile network. During the transmission the sequence of the RLP frames can be confused due to the occurring transmission errors and the ARQ process used for the correction thereof. This consequently entails that the frames are received by the receiver in a changed sequence.

The receiver first checks the RLP frames received for the sequence number in sequence to find out the position of the RLP frame in the present sequence. In another step it will be checked whether the RLP frame received contains a separator. If it contains an initial mark it will be detected to be the first frame in a subsequent PPP frame and is stored in a buffer on the corresponding position. The subsequent RLP frames showing the consecutive numbers are then also stored in the buffer on the corresponding position. This is continued until a PPP frame receives the status of a completely generated frame. A PPP frame is completely generated, if both the initial and the end mark have been received correctly and all RLP frames have been received correctly, without any gaps, and if they are located in the correct sequence between the RLP frame containing the initial mark and the RLP frame containing the end mark. Before the RLP frames are stored in the buffer, the frames are decapsulated, i.e. the control data of the RLP protocol layer are removed.

When checking the RLP packets, not only the PPP packets are differentiated, but the checking of the frames can be extended to the detection of the IP packets. This is the basis for differentiating between the intra-flow mode and inter-flow mode. As was already mentioned, the IP header contains the information in view of the used transport protocol and the corresponding addresses. Due to the fact that an entire IP datagram fits into a PPP frame, the examination of a finalized PPP frame can be assigned to the recognition of an IP datagram and the information thereof, i.e. as to whether IP datagrams of the same of different data flows are concerned.

For this purpose, the control data of the frame are checked after a complete PPP frame has been generated. The data are particularly examined for the control data of the respective protocol layer. This is realized by using a recognizing means for recognizing a completely combined data packet. This means that information in view of the control data of the respective layer must be available to said means, for only on this basis is a decision made which control data derive from the link layer, in particular from the PPP, and where in the PPP frame the control data of the IP control layer start. Due to the fact that the format of the decapsulation of the data is standardized on each layer, an implementation has to be made in said mechanism which is similar to the valid standards of the encapsulation. A closer explanation of the examination of the IP datagrams is indicated in the embodiments explained below.

An IP datagram is transmitted to the protocol layer—the transport layer—directly on top thereof. The TCP packets are equally numbered consecutively, and due to the present numbering the sequence of the TCP packets on the transport layer is generated. In other words, the TCP is responsible for the arrangement of the TCP packets in a correct sequence. On this level also the faulty packets are detected, and the errors are removed by starting an inquiry for the repeated transmission of the packets.

Due to the fact that the TCP is responsible for generating the correct sequence of the transmitted TCP packets, it is no longer required to perform the same also on the network protocol layer. This particularly allows that the IP datagrams are received in a changed sequence. The cause for the receipt of the IP datagrams in the incorrect sequence is the asynchronous transmission thereof. The individual packets can take different paths to the receiver, whereby it can occur that the packets sent overtake each other on their way thereby arriving at the receiver in a changed sequence. Due to the fact that the transport layer, in particular the TCP, is responsible for generating the sequence, it is unimportant as to what extent the sequence of the IP packets on the network layer is changed. This particularly means that the efficiency of the packet processing is not influenced, if the sequence is additionally changed by the RLP protocol layer.

The same refers to the UDP, where the change of the sequence of the packet is permitted.

In the following, an implementation of the invention for the inter-flow mode is explained in more detail by means of FIG. 7.

In the inter-flow mode, packets belonging to different data flows are differentiated. For this purpose, completely generated PPP frames are examined, as was described above. In said mode the PPP frames are already released by the RLP receiver, firstly, when they have been received completely and correctly, and, secondly, when it is guaranteed that no further PPP frames are contained in the data possibly buffered by the RLP receiver which belong to the same data flow of the PPP frames to be released.

After the control data of the IP layer have been recognized, the transport protocol field can be looked for within said data. If the entry in said field is different in the examined PPP frames, definitely different data flows are concerned. If, however, the entry in view of the transport protocol is concurrent, the IP addresses of the transmitters and the receivers are examined. In case of agreement of the addresses, the port number of the transmitters and the receivers is examined. If no differences can be detected during this examination, a PPP frames of the same data flow are concerned.

In the following, according to FIG. 7, the case is assumed, that the transmitter transmits data from two different data flows, the UDP data flow and the TCP data flow, 170. The PPP data packets are generated from the data in an encapsulating process 180. In dependence on whether a UDP data flow or a TCP data flow is concerned, two kinds of PPP data packets, the PPP(IP(TCP(n))) and the PPP(IP(UDP(n))) packets are differentiated. The n hereby designates the sequence number of a UDP packet or a TCP packet. According to FIG. 7 two UDP data packets, PPP(IP(UDP(1))), PPP(IP(UDP(2))) and two TCP data packets PPP(IP(TCP (1))), PPP(IP(TCP(2))) are generated on the PPP protocol layer. These are then transmitted to the RLP protocol layer, which packages the same in a flow of the consecutive RLP frames RLP(1), RLP(2), . . . RLP(12), 190. As was already mentioned above, no difference between the different data packets of the protocol layer on top thereof is made on the RLP protocol layer. According to FIG. 7 the data packet PPP(IP(TCP(1))) is divided into RLP(1), RLP(2), RLP(3) and RLP(4). The other data packets of the network protocol layer are also divided in this manner. The finalized RLP frames are then transmitted via a network 200. During the transmission a change in the sequence of the RLP frames may occur, which can be due to the frequent repeat of incorrectly transmitted RLP frames of the TCP data flow.

Figure 7:
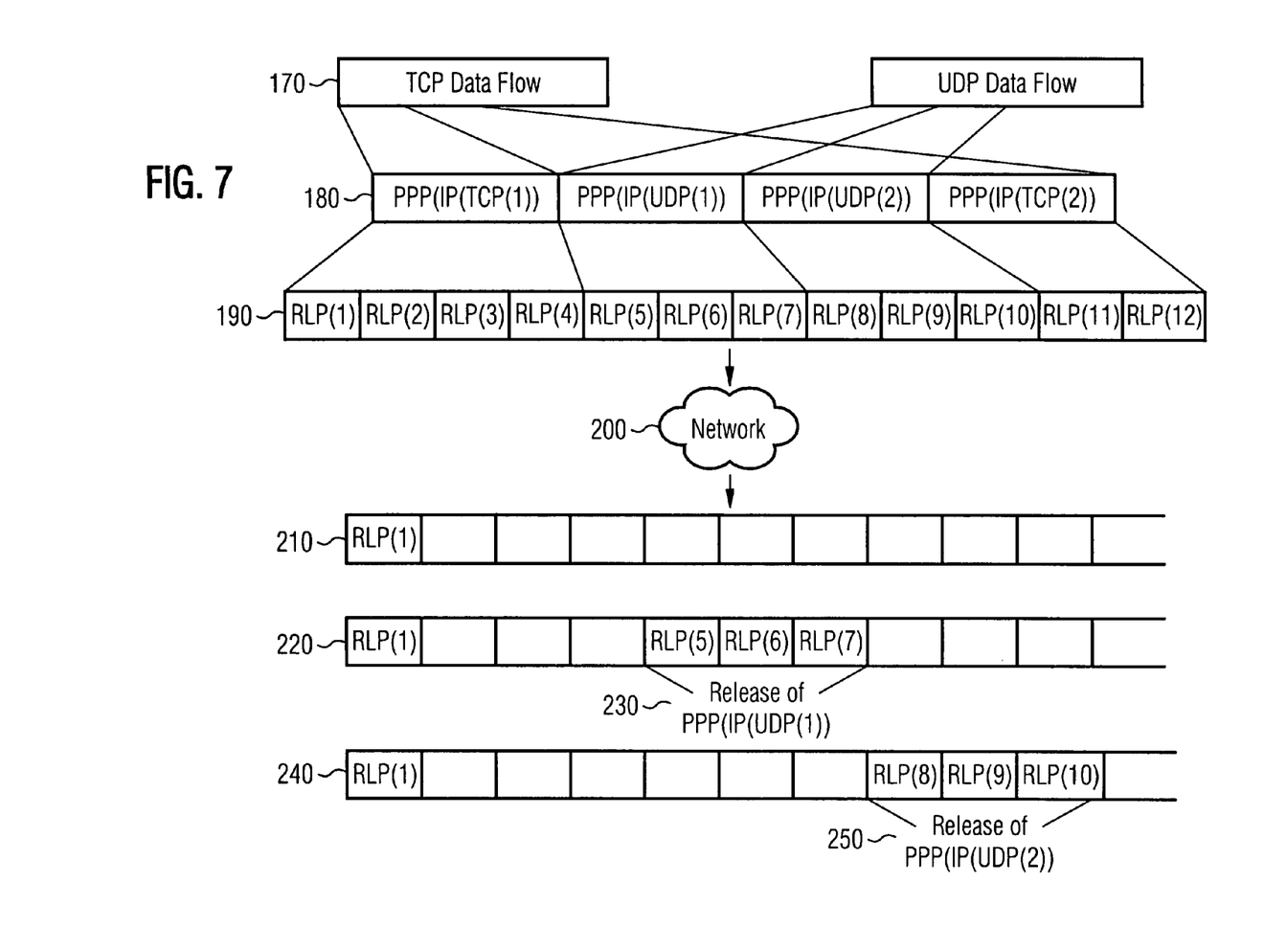
FIG. 7 shows an illustration of an inter-flow mode.

Assuming, the receiver receives, according to FIG. 7, the RLP frame RLP(1) first, 210, and the RLP frames RLP(5), RLP(6), RLP(7) are received thereafter, 220. These are recognized as completely received packet. Consequently, said packet is examined in sequence to detect the type of the data flow. It is recognized to be an UDP packet, PPP(IP(UDP(1))) and is released to the PPP layer, 230. The PPP layer, however, is only released when it has been made sure that definitely no PPP frames of the same data flow are contained in the data possibly buffered by the RLP receiver. In this embodiment it is only admitted to release PPP frames to the PPP protocol layer belonging to different data flows, or to the same data flow, however, only in the correct sequence in view of the numbering of the RLP frames.

According to FIG. 7, the RLP frames RLP(8), RLP(9), RLP(10) are the next to be received, 240. These are then again stored in a buffer and recognized to be a complete PPP(IP(UDP(2))) packet, 250. As the RLP protocol has the information that the first UDP packet PPP(IP(UDP(1))) belonging to the same data flow has already been released, a decision is now taken on the basis of this information to release the PPP(IP(UDP(2))) to the PPP protocol layer. As the PPP frames of the TCP packet have not been generated completely as yet, as the PPP(IP(TCP(1))) only contains the RLP(1), it is still maintained in the buffer. If, however, the PPP(IP(UDP(1))) is not complete either, the PPP(IP(UDP(2))) is kept in the buffer until the PPP(IP(UDP(1))) is completely generated.

The following embodiment suggests an extended implementation, wherein a release of completely generated PPP frames belonging to both different and identical data flows is admitted.

Figure 8:
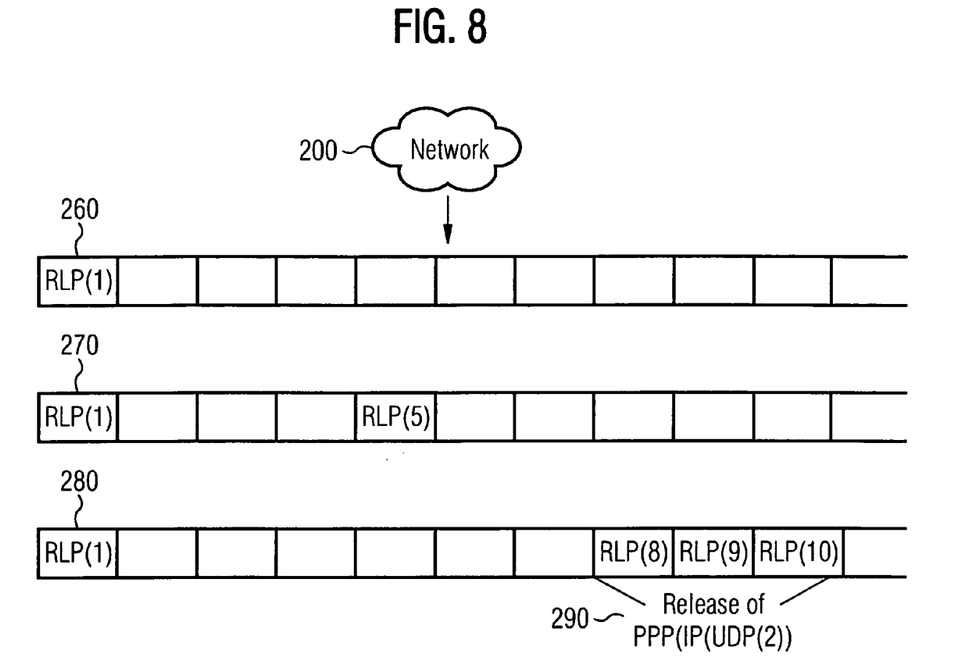
FIG. 8 shows an illustration of an intra-flow mode.

In the following, said embodiment is explained in more detail by means of FIG. 8.

Assuming that due to a temporary bad transmission quality of the connection, which has occurred during the transmission of the first PPP packets, at first the PPP(IP(UDP(2))) is completely received. This takes place due to the receipt of the frames RLP(8), RLP(9), RLP(10), 280. The intermediate memory only contains one RLP frame, the frame RLP(5), 270. Due to the fact that the intra-flow mode is admitted, all completely generated frames, also those belonging to the same data flow, are released. This means, exclusively the completeness of a PPP frame is taken notice of. The higher layers are then responsible for the arrangement of the packets in correct sequence. Also, the RLP(1), which was received first and which constitutes the first frame of an incompletely generated PPP(IP(TCP(1))), is maintained in the buffer, 260.

In the above, the invention was introduced by means of an exemplary application in the GSM field. The same possibilities of application exist in other networks, such as the GPRS network. Said network is drafted for the transmission of a packet oriented application from the transmitter to the receiver. The architecture of the protocol stack is also comparable in both cases.

The invention can also be applied in an environment, in which only one link protocol is provided. This means a single link protocol is implemented instead of the PPP and RLP in the GSM or the LLC and RLC in the GPRS. In this case it is required that said protocol works in a reliable mode. It is, for instance, possible to find this form of implementation in the UMTS.

What is claimed is:

1. Method for improving a processing time of received data in packet oriented applications in a data transmission of data flows between a transmitter and a receiver, each transmission involving a first and a second protocol layer and being carried via a communication network, wherein said method comprises:
   providing a data flow at the first protocol layer as data packets of the first protocol layer;
   releasing data from the first protocol layer to the second protocol layer in the transmitter;
   dividing the data of the first protocol layer into consecutive data packets of the second protocol layer by generating a sequence of data packets with sequence numbers, wherein a data packet of the second protocol layer contains data from only one data packet of the first protocol layer;
   transmitting the data packets of the second protocol layer to the receiver via the communication network;
   sorting received data packets of the second protocol layer at the receiver according to the sequence of the data packets;
   allocating received data packets of the second protocol layer to data packets of the first protocol layer, in the second protocol layer; and
   upon a data packet of the first protocol layer being completely generated from a group of data packets of the second protocol layer allocated to the first protocol layer, examining said completely generated data packet for an association to a data flow, and releasing said completely generated data packet to the first protocol layer without considering the non-delivery of prior data packets of said second protocol layer not a part of said completely generated data packet of said first protocol layer.

2. Method according to claim 1, wherein the data packets of the first protocol layer are clearly differentiated from each other by means of separators.

3. Method according to claim 1, wherein the received data packets are stored in a buffer of the receiver.

4. Method according to claim 1, wherein a data packet of the first protocol layer is given a status of a completely generated data packet, if both an initial and an end mark within data packets of the second protocol layer have correctly been received, and if all data packets of the second protocol layer lying in between have correctly been received.

5. Method according to claim 1, wherein the completely generated data packets of the first protocol layer are examined according to the rules of an encapsulating process, for identifying packets of additional protocol layers.

6. Method according to claim 1, wherein the data packets of the first protocol layer are directly released to the first protocol layer on the second protocol layer, if the data packets of the second protocol layer have firstly been received completely and correctly, and if secondly it has been guaranteed that the data possibly buffered by the receiver of the second protocol layer do not contain additional data packets of the first protocol layer belonging to the same data flow of the data packets of the first protocol layer to be released.

7. Method according to claim 1, wherein on the second protocol layer the data packets of the first protocol layer are directly released to the first protocol layer, if said data packets have been received completely and correctly.

8. Method according to claim 1, wherein the data packets of the first protocol layer are IP datagrams and the data packets of the second protocol layer are PPP frames, wherein PPP frames are corrected by means of repeated transmission when an error occurs.

9. Method according to claim 1, wherein the data packets of the first protocol layer are PPP frames and the data packets of the second protocol layer are RLP data frames.

10. Method according to claim 1, wherein the data transmission is performed via an IP network and a mobile communication network.

11. Method according to claim 1, wherein the first protocol layer supports at least two transmission modes, a reliable and an unreliable mode.

12. Method according to claim 11, wherein the data packets of the second protocol layer are corrected by means of repeated transmission in case of a transmission error and by using the reliable transmission mode.

13. Method according to claim 1, wherein at least one control field comprising control data is provided in the completely generated data packets of the first protocol layer, for delivering the information of a pertinent data flow.

14. Method according to claim 13, wherein the control data are appended to the actual data sequences as control fields in the corresponding protocol layers in form of a header and/or a tail.

15. Method according to claim 1, wherein a data flow is differentiated by means of certain control data in the control fields provided therefor.

16. Method according to claim 15, wherein the control data for differentiating data flows are the addresses of the transmitter and/or receiver in form of source addresses, destination addresses and port numbers.

17. Method according to claim 1 wherein the data packets of the second protocol layer are numbered consecutively and marked by corresponding sequence numbers.

18. Method according to claim 17, wherein the received data packets are sorted into a sequence corresponding to a sequence number.

19. Method according to claim 17, wherein each sequence number is an RLP (Radio Link Protocol) sequence number or an RLC (Radio Link Control) sequence number.

20. Method according to claim 1, wherein the packet oriented applications are internet applications.

21. Method according to claim 20, wherein an internet application is transmitted by means of the transport protocol Transmission Control Protocol (TCP).

22. Method according to claim 20, wherein an internet application is transmitted by means of the transport protocol User Datagram Protocol (UDP).

23. Device for improving a processing time of received data in packet oriented applications in a data transmission of data flows between a transmitter and a receiver, each transmission involving a first and a second protocol layer and being carried via a communication network, said device comprising:

means for providing data packets of a first protocol layer to a second protocol layer, wherein the data of the first protocol layer is divided into consecutive data packets of the second protocol layer by generating a sequence of data packets with sequence numbers, and wherein a data packet of the second protocol layer contains data from only one data packet of the first protocol layer;

transmitting means for transmitting the data packets of the second protocol layer;

receiving means for receiving the transmitted data packets;

means for sorting the received data packets according to the sequence of the data packets, and for allocating the received data packets to data packets of the first protocol layer, in the second protocol layer;

recognizing means for recognizing that a data packet of the first protocol layer has been completely generated from a group of data packets of the second protocol layer allocated to the first protocol layer;

means for examining said completely generated data packet for an association to a data flow; and releasing means for releasing said completely generated data packet to the first protocol layer without considering the non-delivery of prior data packets of said second protocol layer not a part of said completely generated data packet of said first protocol layer.

24. Device according to claim 23 comprising a buffer for temporarily storing the received data packets of the second protocol layer.

* * * * *